United States Patent
Johnson

[15] 3,655,341
[45] Apr. 11, 1972

[54] CARBON BLACK PRODUCTION

[72] Inventor: Paul H. Johnson, Bartlesville, Okla.

[73] Assignee: Phillips Petroleum Company

[22] Filed: Sept. 4, 1969

[21] Appl. No.: 855,113

[52] U.S. Cl. ................................23/209.4, 23/259.5
[51] Int. Cl. .......................................................C09c 1/48
[58] Field of Search ...........................23/209.4, 259.5, 209.9

[56] References Cited

UNITED STATES PATENTS

| | | | |
|---|---|---|---|
| 2,781,246 | 2/1957 | Goldtrap | 23/209.4 |
| 3,046,095 | 7/1962 | Williams | 23/209.4 |
| 3,095,272 | 6/1963 | Naifeh | 23/209.4 |
| 3,235,334 | 2/1966 | Helmers | 23/209.4 |

*Primary Examiner*—Edward J. Meros
*Attorney*—Young and Quigg

[57] ABSTRACT

A method of increasing the photelometer of thermal black by passing the black through a furnace black reactor and in contact with hot gases produced therein. The mixture of thermal black and hot gases can be passed in indirect heat exchange with hydrocarbon feed to form the thermal black which is then passed into the furnace.

4 Claims, 1 Drawing Figure

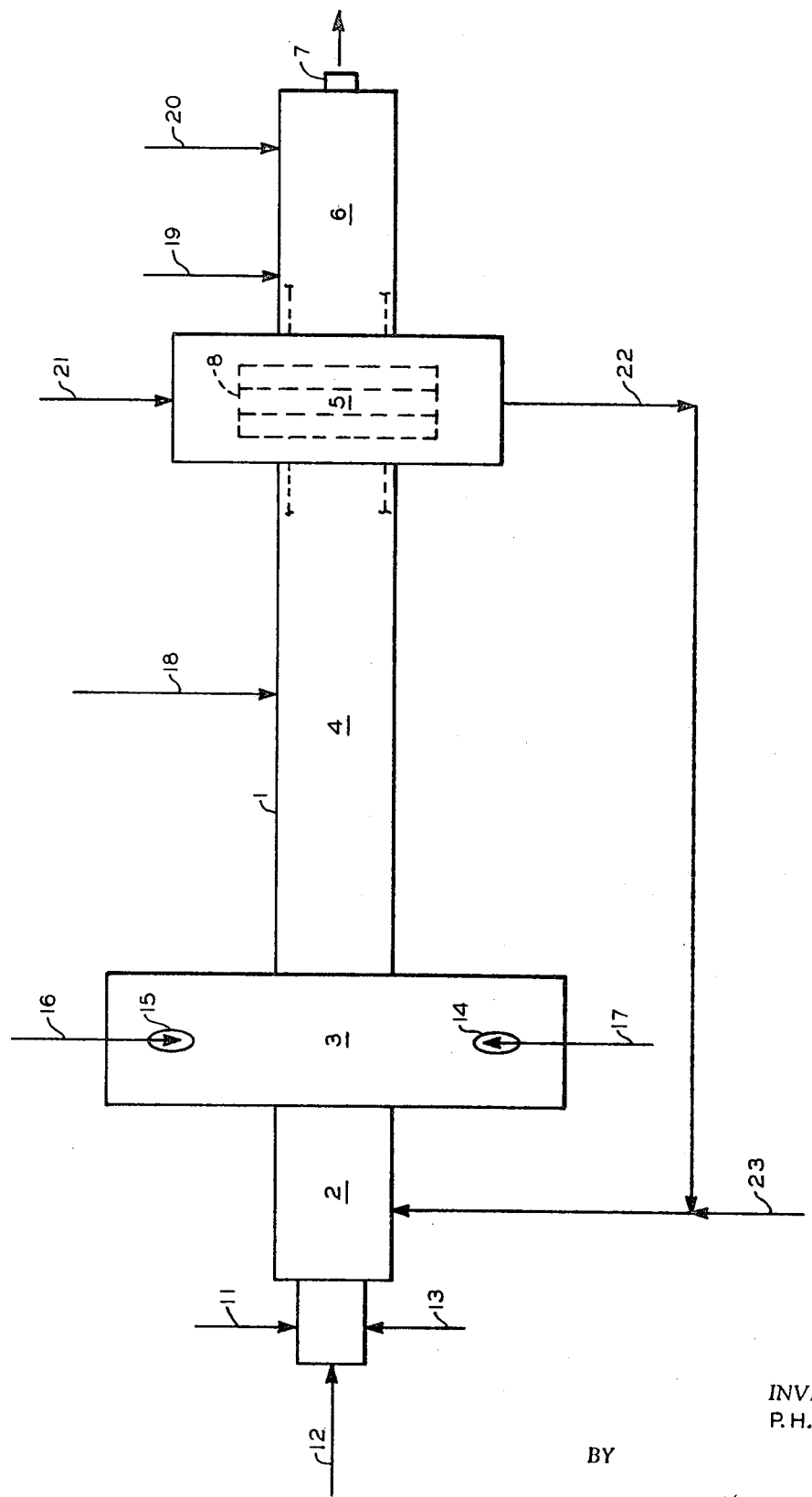

CARBON BLACK PRODUCTION

This invention relates to carbon black.

In one of its more specific aspects, this invention relates to the production of carbon black of improved quality.

The production of carbon black by the thermal process and by the furnace process is well known. In the former, carbon black is produced by contacting a hydrocarbon with a hot surface, generally brick checkerwork to crack the hydrocarbon to carbon and hydrogen. In the latter, a hydrocarbon is pyrolytically decomposed in the presence of an oxidant to produce carbon black. Each process makes a distinct type of black and generally neither process is adaptable to produce the specific black produced by the other process. The two processes produce blacks which differ in respect to their surface area, structure and photelometer values. The method of this invention is directed principally toward modifying the photelometer of thermal black to increase it to that value attainable by the furnace process.

According to the method of this invention there is provided in the method of producing thermal black by cracking a hydrocarbon feed at elevated temperatures upon contact with a heated surface to form thermal black smoke, the improvement comprising introducing the smoke into a furnace reactor, generating hot gases within the furnace reactor and passing the thermal black smoke in contact with the hot gases at temperatures sufficient to increase the photelometer value of the thermal black.

Accordingly, it is an object of this invention to produce a thermal black having improved photelometer characteristics.

It is another object of this invention to provide a method of producing furnace black and thermal black mixtures.

In one embodiment of this invention, the process is operated to produce a furnace-modified thermal black.

In another embodiment of this invention, the process is operated to produce a blend of furnace and thermal blacks.

The method and apparatus of this invention will be more easily understood if explained in conjunction with the attached drawing which illustrates a schematic flow diagram of one embodiment of this invention.

The method of this invention is operable with all conventional reactants normally employed in the production of carbon black, whether by the thermal black or by the furnace process.

It is similarly adaptable to all configurations of carbon black reactors. While the attached drawing illustrates only one type of this reactor, this is not intended to preclude the use of any of the many types of apparatus employed for the production of carbon black.

It is to be understood that the method of this invention is applicable to thermal blacks regardless of how produced. While the invention is described herein in terms of a process in which the heat for the cracking of a hydrocarbon feed to produce thermal black is derived from the hot gases produced in a carbon black reactor, it is to be understood that the heat for the production of the thermal black can be supplied from an extraneous source. In such a method, the combined smoke and hot gases from the reactor are simply quenched to the desired temperature, the heat exchange step with the incoming hydrocarbon feed being omitted.

Referring now to the attached drawing, there is shown in outline the internal configuration of reactor 1 comprised of any number of reaction zones, typical of which are axial zone 2, combustion zone 3, reaction zone 4, thermal zone 5, quench zone 6, and outlet 7 leading to carbon black recovery facilities. Into zone 2 are introduced any of the conventional reactants by conduits 11, 12, 13, the means for their introduction being positionable to discharge into either zone 2 or zone 3.

Similarly, any of the conventional reactants are introducible into zone 3 from its ports 14, 15 from conduits 16 and 17.

Conduits 18, 19 and 20 represent any plurality of conduits for the introduction of quench into the reactor to cool the smoke produced.

Thermal zone 5 comprises an indirect heat exchanger 8 in combination with refractory means which facilitates the conversion of that hydrocarbon feedstock, introduced thereinto through conduit 21, into thermal black. Preferably, exchanger 8 comprises a refractory type heat exchanger through which hydrocarbon introduced through conduit 21 passes in impinging relationship to produce thermal black.

Heat is supplied to the hydrocarbon introduced through conduit 21 by that smoke passing through thermal zone 5 and through exchanger 8 from reaction zone 4. Indirect heat exchange between the hydrocarbon and the smoke is made through the heat transfer surfaces of exchanger 8 in which the respective streams are prevented from intermixing.

Heat exchanger 8 can be of any suitable construction. Preferably, it will consist of a series of ceramic tubes, the smoke passing through the tubes and that hydrocarbon introduced through conduit 21 passing on the outside of, and in impinging relationship to, the tubes. This impingement of the hydrocarbon on the outside of the tubes acts to decompose the hydrocarbon with the resultant formation of thermal carbon black.

In order to increase the heat transfer through the surfaces of the ceramic tubes and to prevent the deposition of carbon black within the tubes, with its attendant decrease in heat transfer through the walls of the tubes, the internal area of the tubes is preferably reduced by establishing in the tubes a centrally positioned core which forms an annulus with the inner wall of the tubes. This reduction in flow area of the tube causes the smoke to pass through the annulus at increased velocity which, in turn, increases the heat transfer through the tube and minimizes deposition of carbon black in the tube.

As a result of the heat transferred to that hydrocarbon introduced through conduit 21 in thermal zone 5 and the impingement of the hydrocarbon on the hot surfaces, the hydrocarbon is cracked to produce a thermal black which leaves zone 5 as a smoke through conduit 22 and enters reactor 1.

If additional heat recovery and cracking time are required, conduit 22 is advantageously positioned as a conduit extending through the reactor and into which heat is transferred from the reactor.

Introduction of the thermal black smoke into reactor 1 can be made either into axial zone 2 or into combusion zone 3. Similarly, in either instance, the smoke can be conducted into zone 3 with or without the introduction of reactants into reactor 1 through conduits 11, 12, and 13.

If reactants are introduced through 11, 12 or 13, any suitable combination of reactants can be employed with the result that if hydrocarbon feed is so introduced, furnace carbon black will be produced therefrom so that the end product will be a mixture of furnace and thermal carbon black in any desired proportions.

Whether or not reactants are introduced through conduits 11, 12, and 13, there can be introduced into zone 3 from ports 14 and 15 by means of conduits 16 and 17 any desired combination of reactants with the result that if hydrocarbon feed is so introduced, carbon black will be subsequently produced therefrom so that the end product will be a mixture of furnace and thermal carbon blacks in any desired proportions.

Accordingly, it is seen that the method of operation can be conducted with the introduction of any combination of reactants, these being introduced only into axial zone 2, or only into combustion zone 3, or into both axial zone 2 and combustion zone 3. In either mode of operation, desired proportions between reactants can be introduced in any desired proportion between zones. Such proportioning can be to the effect of introducing only an oxidant and fuel into zone 2 or zone 3.

In any of the possible modes of operation, whether simply the combustion of a fuel or whether involving the pyrolytic decomposition of hydrocarbon reactant to form carbon black, the operation is conducted at such quantities as to bring that smoke introduced through conduit 22 to a temperature sufficient to raise the photelometer of the thermal black contained therein to desired levels, and preferably to a value not less than about 90. Generally, this temperature will be from about 2,000° F to about 2,500° F.

After the completion of the reactions in zone 4, these reactions including increasing the photelometer of the thermal black smoke, with or without the production of furnace black, the hot smoke can be passed in heat exchange in exchanger 8 with that charge stream entering through conduit 21, and into quench zone 6 where it is quenched to reduce its temperature before passing to carbon black recovery equipment through outlet 7. Similarly, this heat exchange step can be eliminated and the combined streams simply quenched and passed to carbon black recovery. In this instance, thermal black smoke is introduced through conduit 23 and heat exchanger 8 is eliminated.

The following example illustrates the operation of the method of this invention in that embodiment in which air and fuel were introduced into the combustion zone of the carbon black reactor to raise the temperature of the thermal smoke introduced thereinto, the final product being solely thermal black.

About 23,000 SCF per hour of hydrocarbon gas, having the composition shown below, was preheated to a temperature of about 1,200° F and at a pressure of 20 psia was introduced into thermal zone 5.

GAS COMPOSITION

|  | Volume Percent |
|---|---|
| $CH_4$ | 81.8 |
| $C_2H_6$ | 6.4 |
| $C_3H_8$ | 2.8 |
| $iC_4H_{10}$ | 0.1 |
| $N_2$ | 8.5 |
| $H_2$ | 0.4 |
| Total: | 100.0 |

It was impinged upon the surface of exchanger 8, thereby being brought to a temperature of 2,000° F. The thermal black in the smoke exiting through conduit 22 had the following properties: 6 m²/gm surface area; 32 cc/100 gm (DBP) structure; photelometer of 2.

This thermal black smoke was introduced into the combustion zone of a conventional furnace black reactor.

Through two combustion ports and peripheral to the flow pattern of the axially-introduced thermal smoke were introduced combustion gases at a temperature of 2,500° F, these gases being produced from the combustion of about 1,300 SCF per hour of natural gas fuel with about 40,000 SCF per hour of air.

The combined reaction mixture was conducted through zone 4 at a temperature of about 2,400° F and into zone 5 at about 2,400° F. The mixture left exchanger 8 at a pressure of about 16 psia and a temperature of about 2,100° F, after which it was quenched with water and routed to recovery facilities. About 730 pounds per hour of thermal carbon black was recovered from the filters and had the following properties:

$N_2SA$, m²/gm, 6
Structure (DBP) cc/100 gm, 32
Photelometer, 90

It will be seen from the above that the method of this invention can be employed to produce thermal black of high photelometer values. It will also be seen that the method of this invention can be employed to produce a wide variety of carbon blacks depending upon the relative proportions of the thermal and the furnace carbon blacks incorporated in the final product.

Any of the conventional adjuncts practiced in the production of furnace carbon black can be combined with the method of the operation of this invention. For example, some portion of the off-gases from the carbon black recovery facilities can be introduced into the reactor; structure-affecting additives can be introduced into the reactor; oxygen enrichment of any of the oxygen containing streams can be employed; combustion gases can be introduced radially or tangentially into the furnace.

Other modifications will be evident in light of the above disclosure but such are considered as being within the scope of the invention.

What is claimed is:

1. A method of producing carbon black which comprises:
   a. introducing thermal carbon black and hot combustion gases produced by the oxidation of a fuel into the upstream end of a carbon black reactor;
   b. passing said thermal carbon black and said hot combustion gases through said reactor under conditions to increase the photelometer value of said thermal carbon black;
   c. passing the thermal carbon black and said hot combustion gases in indirect heat exchange with a hydrocarbon feed whereby the hydrocarbon feed is pyrolytically decomposed to thermal black;
   d. introducing the thermal carbon black formed in step (c) into the carbon black reactor according to step (a); and
   e. recovering thermal carbon black from the downstream end of said reactor.

2. The method of claim 1 in which a hydrocarbon feed is introduced into the upstream end of said carbon black reactor and said hydrocarbon feed is contacted with said hot combustion gases to produce furnace carbon black, and said furnace carbon black is recovered from the downstream end of said reactor in admixture with said thermal black.

3. The method of claim 1 in which the photelometer of said thermal carbon black is increased to a value of not less than about 90.

4. The method of claim 2 in which said thermal carbon black is introduced into said reactor while transferring heat to said thermal carbon black from said reactor by passing said thermal black through a conduit positioned through said reactor.

* * * * *